(12) United States Patent
Favrot et al.

(10) Patent No.: US 6,800,582 B2
(45) Date of Patent: Oct. 5, 2004

(54) PROCESS OF PREPARATION OF AMINO FUNCTIONALIZED DIENE POLYMERS, POLYMERS OF SUCH TYPE, RUBBER COMPOSITION AND TIRE CASING CONTAINING THOSE POLYMERS

(75) Inventors: Jean-Michel Favrot, Cournon (FR); Philippe Laubry, Marsat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/401,489

(22) Filed: Mar. 28, 2003

(65) Prior Publication Data

US 2003/0195309 A1 Oct. 16, 2003

Related U.S. Application Data

(62) Division of application No. 09/478,738, filed on Jan. 6, 2000, now Pat. No. 6,624,267.

(30) Foreign Application Priority Data

Jan. 6, 1999 (FR) .......................................... 99 00080

(51) Int. Cl.⁷ ................................................ C08F 4/48
(52) U.S. Cl. .................... 502/154; 502/153; 502/155; 502/157; 526/175; 526/176; 526/177; 526/180; 526/187; 526/190
(58) Field of Search ............................... 502/153, 154, 502/155, 157; 526/175, 176, 177, 180, 187, 190

(56) References Cited

U.S. PATENT DOCUMENTS

| | | | | |
|---|---|---|---|---|
| 4,129,705 A | * | 12/1978 | De Zarauz .................. | 526/175 |
| 4,361,682 A | | 11/1982 | Freppel ....................... | 526/66 |
| 4,446,290 A | | 5/1984 | Ikematu et al. ............. | 526/174 |
| 4,590,052 A | | 5/1986 | Chevallier et al. .......... | 423/335 |
| 4,647,625 A | | 3/1987 | Aonuma et al. ............ | 528/232 |
| 4,996,273 A | | 2/1991 | Van Der Huizen ......... | 526/177 |
| 5,001,196 A | | 3/1991 | Kawanaka et al. ......... | 525/281 |
| 5,100,965 A | * | 3/1992 | Hsu et al. ............... | 526/173 X |
| 5,248,736 A | | 9/1993 | Suzuki et al. .............. | 525/346 |
| 5,281,671 A | | 1/1994 | Suzuki et al. .............. | 525/212 |
| 5,329,005 A | | 7/1994 | Lawson et al. ............. | 540/450 |
| 5,403,570 A | | 4/1995 | Chevallier et al. .......... | 423/339 |
| 5,665,812 A | | 9/1997 | Gorce et al. ................ | 524/495 |
| 5,753,579 A | * | 5/1998 | Jalics et al. ................. | 502/153 |
| 6,117,927 A | | 9/2000 | Toba et al. ................. | 524/261 |

FOREIGN PATENT DOCUMENTS

| | | |
|---|---|---|
| EP | 0590491 | 4/1994 |
| EP | 0661298 | 7/1995 |
| EP | 0810258 | 12/1997 |
| FR | 2294186 | 7/1976 |
| WO | 9637547 | 11/1996 |
| WO | 9928376 | 6/1999 |

OTHER PUBLICATIONS

English language abstract for JP1135847, Iwakazu et al. May 29, 1989.
Chemical Abstracts No. 99511, vol. 112, No. 12, Shimida et al. "Manufacture of Conjugated Diene Polymers," Mar. 19, 1990, XP002113272.
"Dispersibility Measurements of prec. silicas' influence of dispersion on mech. properties," Rubber World, Jun. 1994 pp. 20–24.

* cited by examiner

*Primary Examiner*—Fred Teskin
(74) *Attorney, Agent, or Firm*—Burns, Doane, Swecker & Mathis, L.L.P.

(57) ABSTRACT

The present invention provides a process for preparing amino functionalized diene polymers with 1,4-trans linkage content equal to or greater than 70%. The invention also concerns polymers of such type, a rubber composition and a tire casing containing those polymers. The process of preparation according to the invention comprises polymerizing at least one diene monomer by means of a lithium catalytic system, which comprises at least one hydrocarbon solvent, one compound A of a IIIA group metal, one compound B of an alkaline earth metal and one aminolithium initiator C. Amino functionalized diene polymers with high 1,4-trans linkage content according to the invention are such that the amino function, situated at the end of the polymer chain, is a tertiary amino function, the rate of functionalization of said polymers being equal to or greater than 50% and the 1,4-trans linkage content being equal to or greater than 70%. A rubber composition vulcanizable with sulfur according to the invention is such that it contains at least said polymer. A tire casing according to the invention is such that it contains said composition.

12 Claims, No Drawings

PROCESS OF PREPARATION OF AMINO FUNCTIONALIZED DIENE POLYMERS, POLYMERS OF SUCH TYPE, RUBBER COMPOSITION AND TIRE CASING CONTAINING THOSE POLYMERS

CROSS REFERENCE TO RELATED APPLICATION(S)

The present application is a divisional application of U.S. application Ser. No. 09/478,738, filed Jan. 6, 2000, now U.S. Pat. No. 6,624,267, which claims priority to French Application No. FR99/00080, filed Jan. 6,1999.

BACKGROUND OF THE INVENTION

The present invention concerns a process of preparation of amino functionalized diene polymers with 1,4-trans linkage content equal to or greater than 70%. The invention also concerns polymers of such type, a rubber composition and a tire casing containing said polymers.

Applicant has described, in French Patent FR-A-2,294,186, a process of polymerization of conjugated dienes or of copolymerization of conjugated dienes, either with other conjugated dienes or with vinylaromatic compounds. The examples of polymers obtained, which appear in that document, present 1,4-trans linkage contents covering a wide range, extending from 24% to 90%.

This process consists essentially of reacting the monomers in the presence of a catalytic composition made up of an organolithium initiator and of a co-catalyst. The latter comprises a barium or strontium compound and an organometallic compound of IIB or IIIA group metals of the periodic classification of elements.

More precisely, said organolithium initiator can be, for example:

- an aliphatic organolithium, such as ethyl lithium, n-butyl lithium, isobutyl lithium, sec-butyl lithium, ter-butyl lithium, isopropryl lithium, n-amyl lithium and isoamyl lithium;
- an alkene organolithium, such as allyl lithium, propenyl lithium and isobutenyl lithium;
- a living polymer, such as polybutadienyl lithium, polyisopropenyl lithium and polystyryl lithium;
- a polymethylene dilithium, such as 1,4-dilithiopentane, 1,5-dithiopentane and 1,20-dilithioeicosane;
- an aromatic organolithium, such as benzyl lithium, phenyl lithium and 1,1-diphenylmethyl lithium;
- a polylithium obtained from an aryl-substituted ethylene compound, the latter being, for example, 1,1-diphenylethylene, trans-stilbene and tetraphenylethylene;
- a radical ion, such as lithium naphthalene, lithium anthracene, lithium chrysene and lithium diphenyl;
- a derivative substituted by one or more alkyls.

The said barium or strontium compound is, for example, a hydride, or a mono- or polyfunctional organic acid, such as an alcoholate.

As for said organometallic compound of IIB or IIIA group metals, it may be, for example a dialkyl zinc or cadmium, a halogenated or nonhalogenated organoaluminum, an organoborium or a dialkyl aluminum hydride.

One can also cite U.S. Pat. No. 4,996,273, which discloses a process of anionic preparation of polybutadiene having a 1,4-trans linkage content ranging between 82% and 91%, consisting of using an organolithium initiator, a barium, strontium or calcium compound and a trialkylaluminum compound having at least 13 carbon atoms.

It will be noted that neither the FR-A-2,294,186 nor U.S. Pat. No. 4,996,173 mentions obtaining functional polymers.

Also known, from European Patent EP-A-661,298, is a process of preparation of diene polymers which are amino-functionalized and comprise an alkoxysilane group. These polymers are, notably, characterized by a 1,2 linkage content ranging between 14% and 16%, that is, by an overall 1,4-cis and 1,4-trans linkage content ranging between 84 and 86%, which implies a 1,4-trans linkage content very appreciably below 80%, in the order of 60% at most.

This process consists, notably, of using, on the one hand, a lithium amide base catalytic initiator and, on the other, a randomizing agent making it possible to control the 1,2 linkage content in the polymers prepared, and then of reacting the living polymer obtained with an alkoxysilane compound.

Said initiator is, for example lithium hexamethylene imide.

As for said randomizing agent, it can be an ether, an orthodimethoxybenzene, an alkali metal complex and a phosphorous acid ketone or triester, oxygenated derivatives of an alkali or alkaline earth metal, like lithium, sodium, potassium, calcium or barium, or even a tertiary amine.

All of the examples of preparation appearing in EP-A-661,298 refer to processes for obtaining styrene-butadiene copolymers. These processes consist of directly adding the said initiator and the said randomizing agent to the polymerization medium, which consists of styrene and butadiene monomers and of a polymerization solvent.

Concerning the anionic preparation of polymers containing an amino function, European Patent EP-A-590,491 can also be cited. This document mentions the use of an aminolithium initiator consisting, for example, of hexamethyleneimine, notably, for obtaining styrene and butadiene copolymers presenting a narrow distribution of molecular weights. The copolymers obtained are characterized by vinyl linkage content of at least 34.9%, that is, by 1,4-trans and 1,4-cis linkages equal to not more than 65.1%, which implies an even lower 1,4-trans linkage content.

SUMMARY OF THE INVENTION

The present invention provides a process for preparing of amino functionalized diene polymers with 1,4-trans linkage content equal to or greater than 70%. The invention also concerns polymers of such type, a rubber composition and a tire casing containing the polymers.

The process of preparation according to the invention involves polymerizing at least one diene monomer by means of a lithium catalytic system, which consists essentially of at least one hydrocarbon solvent, one compound A of a IIIA group metal, one compound B of an alkaline earth metal and one aminolithium initiator C.

Amino functionalized diene polymers with high 1,4-trans linkage content according to the invention are such that the amino function, situated at the end of the polymer chain, is a tertiary amino function, the rate of functionalization of said polymers being equal to or greater than 50% and the 1,4-trans linkage content being equal to or greater than 70%.

A rubber composition vulcanizable with sulfur according to the invention is such that it contains at least said polymer.

A tire casing according to the invention is such that it contains said composition.

DETAILED DESCRIPTION OF THE INVENTION

In accordance with this invention, it was sought to employ a new polymerization process which makes it possible to obtain tertiary amino functionalized polymers at chain end and containing a 1,4-trans linkage content which is at least 70%.

For such purpose, according to the invention, the process of preparing amino functionalized diene polymers with 1,4-trans linkage content equal to or greater than 70%, which involves polymerizing at least one diene monomer by means of a lithium catalytic system, is characterized in that said catalytic system consists essentially of at least one hydrocarbon solvent, one compound A of a IIIA group metal, one compound B of an alkaline earth metal and one aminolithium initiator C.

As representative examples of the A compounds used, the following organometal compounds can be cited:

halogenated or nonhalogenated organoaluminums such as triethylaluminum, triisobutylaluminum, diethylaluminum chloride, ethylaluminum dichloride, ethylaluminum sesquichloride, and methylaluminum sesquichloride; dialkylaluminum hydrides, such as diethylaluminum hydride, diisobutylaluminum hydride, etc.

A trialkylaluminum compound A is preferably used, the number of carbon atoms of which ranges from 1 to 12, and advantageously trioctylaluminum.

As representative examples of the B compounds used, the following barium or strontium compounds can be cited:

$H_2Ba$ and $H_2Sr$ hydrides, mono- or polyfunctional organic acids of formulas $(R—COO)_2$ Ba or Sr, $R_1—(COO)_2$ Ba or Sr, in which R and $R_1$ are organic radicals, the first monovalent and the second divalent, the corresponding thioacids, mono- or polyfunctional alcoholates and the corresponding thiolates; mono- or polyfunctional phenates and the corresponding thiophenates; barium or strontium alcohol acid and phenol acid salts and the corresponding thioproducts; barium or strontium β-diketonates such as the reaction products of barium or strontium with acetylacetone, dibenzoylmethane, thenoyltrifluoroacetone, benzoyltrifluoroacetone and benzoylacetone; the organic derivatives of barium or strontium, such as those of 1,1-diphenylethylene, 1,2-acenaphthylene, tetraphenylbutane, a-methylstyrene, or even those such as diphenyl barium or strontium, bis-cyclopentadienyl barium or strontium, trialkysilyl barium or strontium, and triphenylsilyl barium or strontium; mixed organic derivatives such as phenylbarium iodide, methylstrontium iodide, barium or strontium salts of secondary amines; cetyl metals such as barium or strontium benzophenone, barium or strontium cinname and the corresponding alkylated products as well as the sulfur homologues; the radical ions of barium and strontium, such as those of naphthalene, anthracene, chrysene, diphenyl, etc.

A calcium alcoholate can also be used for compound B.

A barium alcoholate is preferably used for said compound B, advantageously, barium ethyldiglycolate or barium nonylphenoxide.

As for the said aminolithium initiator C, it may be preferably a lithium amide or a polymer obtained by anionic means which presents a C—Li bond and an amino function.

Said lithium amide preferably corresponds to formula XLi, with X in the $X_1$ or $X_2$ forms corresponding to the following formulas:

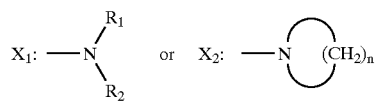

or as described, for example, in the work by T. C. Cheng, *Anionic Polymerization* published by the American Chemical Society, Washington, p. 513, 1981, the content of which is incorporated by reference in the present specification. Formula $X_1$ is such that $R_1$ and $R_2$ are each an alkyl group independent of one another, the number of carbon atoms of the $R_1$ and $R_2$ set, preferably ranging from 2 to 15. As for formula $X_2$, it comprises a cycloalkyl group, n being a whole number, preferably ranging from 2 to 15.

Preferably, $R_1$ and $R_2$ can each be an ethyl or butyl radical or together form a cycloalkyl radical having 4 to 6 carbon atoms.

Also according to a preferential characteristic of the invention, initiator C is prepared in the absence of a polar agent.

Still more preferably, lithium dibutyl amide or lithium hexamethylene imide is used for C.

According to a first embodiment of the invention, the said catalytic system consists essentially of a co-catalyst, resulting from the reaction product in the said hydrocarbon solvent of said compound A and of said compound B, and of the said initiator C.

According to a first working example of that first embodiment, the process of preparation according to the invention then comprises the following stages:

in a first stage, the said co-catalyst is prepared by reacting the two metal compounds A and B in the said inert hydrocarbon solvent. The mixture obtained is then heated at a temperature ranging between 20° C. and 120° C. and preferably between 30° C. and 50° C. and for a duration sufficient to make possible the reaction of both compounds A and B. This duration generally ranges between 1 and 60 minutes and preferably between 20 and 40 minutes;

in a second stage, the said co-catalyst is brought into contact with the polymerization medium containing, for example, one or more monomers dissolved in a polymerization solvent;

in a third stage, the said initiator C is added to the polymerization medium thus obtained, so as to react the mixture obtained in said second stage, and the polymerization reaction is subsequently stopped in order to obtain said polymers, which are then functionalized by a chain-end amino function. These polymers are recovered as known per se.

According to a second working example of that first embodiment, in which the said initiator C consists essentially of a polymer obtained by anionic means, which presents a C—Li bond and an amino function, the process of preparation according to the invention then comprises the following stages:

a first stage is the same as that described for the said first example;

a second stage comprises adding the said polymeric initiator C to the premix obtained in the first stage and formed by compounds A and B, possibly after having added an alkyl lithium compound to improve the activity of the catalytic system. Said alkyl lithium compound is preferably butyl lithium;

a third stage comprises adding the catalytic system thus obtained to the said polymerization medium.

The temperature conditions are the same as those of the said first example.

According to a second embodiment of the invention, in which the said initiator C consists essentially of a polymer obtained by anionic means, which presents a C—Li bond and an amino function, the said catalytic system consists essentially of a premix of the said compounds A and C in the said hydrocarbon solvent and of the said compound B. More precisely, said premix containing compounds A and C is added to the polymerization medium, and then said compound B is added to all that.

In these two embodiments of the process of preparation according to the invention, one uses a quantity of reagents A and B such that the A/B molar ratio ranges between 0.5 and 5, preferably between 2.5 and 4. One further uses a quantity of both reagents B and C, such that the C/B molar ratio ranges between 0.2 and 4, preferably between 1.5 and 4.

Furthermore, the polymerization solvent is preferably a hydrocarbon solvent, preferably cyclohexane, and the polymerization temperature ranges between 20° C. and 150° C. and preferably between 60° C. and 110° C. The alkaline earth metal concentration of the catalytic system ranges between 0.01 mol.l$^{-1}$ and 0.5 mol.l$^{-1}$ and preferably between 0.03 mol.l$^{-1}$ and 0.25 mol.l$^{-1}$.

It will be observed that polymerization according to the invention can be continuous or discontinuous or even be carried out en masse. The polymers can be block, statistical, sequenced or microsequenced.

An amino-functionalized diene polymer with high 1,4-trans linkage content according to the invention is such that
the amino function group, situated at the end of the polymer chain, is a grafted noncyclic or cyclic tertiary amino function group, so that the chain end of the polymer corresponds, according to the circumstance, to the formula:

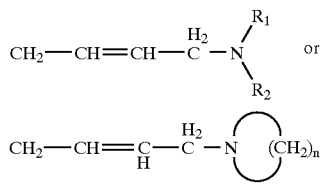

where $R_1$ and $R_2$ are each an alkyl group independent of one another, the number of carbon atoms of the $R_1$ and $R_2$ set preferably ranging from 2 to 15, n being a whole number preferably ranging from 2 to 15,
that the functionalization rate of said polymer is equal to or greater than 50%, and
that the 1,4-trans linkage content is equal to or greater than 70%.

Such a polymer according to the invention, comprising an amino function and presenting a high 1,4-trans linkage content, is notably intended to be incorporated in a rubber composition vulcanizable with sulfur, containing a reinforcing filler, which can be based on a reinforcing white filler or carbon black filler.

Reinforcing white filler is understood to mean a white filler capable of alone reinforcing, with no means other than a filler/intermediate elastomer matrix bonding agent, to provide a rubber composition intended for the manufacture of tires, capable in other words of replacing in its reinforcing function a conventional carbon black filler of tire grade.

Such a reinforcing white filler can, for example, be made of silica.

As silica capable of being used in a composition according to the invention, all the precipitated or pyrogenated silicas known to the expert are suitable, with a BET surface value equal to or less than 450 m$^2$/g and a CTAB specific surface value equal to or less than 450 m$^2$/g, with highly dispersible precipitated silicas being preferred.

Highly dispersible silica is understood to mean any silica having a capacity for disagglomeration and dispersion in a very large polymeric matrix observable by electron or optical microscopy on fine sections. The dispersibility of silica is also appreciated by means of an ultrasonic disagglomeration capacity test followed by a measurement, by granulometric diffraction, of the size of the silica particles, in order to determine the median diameter (D50) of the particles and the disagglomeration factor (Fd) after disagglomeration, as described in patent EP-A-520,860, the content of which is incorporated herein, or as also described in the article that appeared in *Rubber World* (June 1994), pp. 20–24, Dispersibility Measurements of prc. silicas, also incorporated herein by reference.

As nonlimiting examples of such preferred highly dispersible silicas, one can mention those having a CTAB surface of value equal to or less than 450 ml/ g and, in particular, those described in European Patents EP-A-157,703 and EP-A-520,862, or the Perkasil KS 430 silica of the AKZO company, the Zeosil 1165 MP and 85 MP silicas of the Rhodia company, the HI-Sil 2000 silica of the PPG company and the Zeopol 8741 or 8745 silicas of the Huber company.

However, the silicas preferably suitable are those having:
a CTAB specific surface value ranging between 30 and 250 m$^2$/g and preferably between 60 and 200 m$^2$/g,
a BET specific surface value ranging between 30 and 300 m$^2$/g and preferably between 70 and 240 m$^2$/g,
a DOP oil absorption value less than 300 ml/100 g and preferably between 200 and 295 ml/100 g,
a median diameter (D50), after ultrasonic disagglomeration, equal to or less than 3 microns and preferably less than 2.8 microns, for example, less than 2.5 microns,
an ultrasonic disagglomeration factor (Fd) greater than 10 ml, preferably greater than 11 ml and, more preferably, equal to or greater than 21 ml,
a BET specific surface/CTAB specific surface ratio, the value of which ranges between 1.0 and 1.2.

The physical state of the silica does not matter, whether it is in the form of powder, microbeads, granules or balls.

Of course, silica is also understood to mean mixtures of different silicas. Silica can be used alone or in the presence of other white fillers. The CTAB specific surface value is determined according to the method of the NFT 45007 standard of November 1987. The BET specific surface value is determined according to the method of Brunauer, Emmet and Teller, *J. Amer. Chem. Soc.* 80:309 (1938), corresponding to the NFT 45007 standard of November 1987.

One can also use as reinforcing white filler, on a nonlimiting basis:
aluminas (of formula $Al_2O_3$), such as the high-dispersibility aluminas described in European Patent EP-A-810,258, or
aluminum hydroxides, such as those described in international patent WO-A-99/28376.

According to another working example of a composition of the invention, said reinforcing filler can be carbon black.

All blacks commercially available or conventionally used in tires and, in particular, in treads are suitable as carbon blacks. As nonlimiting examples, the N234, N339, N326 and N375 blacks can be cited.

Carbon black/silica mixtures or the blacks partially or totally coated with silica are also suitable for the invention.

Carbon blacks modified by silica are likewise suitable as reinforcing filler, such as, on a nonlimiting basis, the fillers marketed by the Cabot company under the "CRX 2000" name and described in international patent WO-A-96/37547.

The reinforcing filler proportion can vary from 30 to 100 parts by weight per 100 parts polymer according to the invention.

It will be observed that the polymers obtained according to the invention can advantageously be functionalized by different electrophilic coupling agents in order to produce a function interactive with the aforesaid filler. One can, notably, mention, for these coupling agents, tin derivatives such as those cited in Japanese Patent JP-A-1,135,847, and amino derivatives such as those cited in U.S. Pat. Nos. 5,248,736, 5,281,671, 4,647,625 and 5,001,196.

The rubber composition according to the invention can further embrace, in standard fashion, when the reinforcing filler is a reinforcing white filler, a white filler/elastomer matrix bonding agent, which has the function of ensuring a sufficient bond, of a chemical and/or physical nature, between said white filler and the matrix, while facilitating the dispersion of that white filler in said matrix.

Filler/polymer bonding agents can be used, for example, comprising the alkoxysilanes mentioned in European Patent EP-A-692,493.

In addition, a rubber composition according to the invention can further contain the other constituents and additives customarily used in rubber compounds, such as plasticizers, pigments, antioxidants, condensation catalysts, sulfur, vulcanization accelerators, dilute oils, etc.

The resulting composition according to the invention advantageously presents, in vulcanized state, improved hysteretic properties.

Such a rubber composition according to the invention is intended to be incorporated in a tire casing, with a reduction of the tire rolling resistance resulting from said improved hysteretic properties.

The aforesaid characteristics of this invention, as well as others, will be better understood by reading the following description of several working examples of the invention, given by way of nonlimitative illustration.

The term "polymer" below covers both homopolymers and copolymers, the term "copolymer" covering the polymers each obtained from two or more than two monomers, such as terpolymers.

Diene polymer is understood to mean any homopolymer obtained by polymerization of a conjugated diene monomer having from 4 to 12 carbon atoms, and any copolymer obtained by copolymerization of one or more dienes conjugated with each other or with one or more vinylaromatic compounds having from 8 to 20 carbon atoms. One can mention as conjugated diene, notably, 1,3-butadiene, 2-methyl-1,3-butadiene, 2,3-di(alkyl in C1 to C5)-1,3-butadienes such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, phenyl-1,3-butadiene, an aryl-1,3-butadiene, 1,3-pentadiene and 2,4-hexadiene.

Styrene, ortho-, meta- and paramethylstyrene, the "vinyltoluene" commercial mixture, paratertiobutylstyrene, methoxystyrenes, chlorostyrenes, vinylmesithylene, divinylbenzene and vinylnaphthalene are, notably, suitable as vinylaromatic compounds.

Two examples (1 and 2) are presented below of known processes for the preparation of polymers with high 1,4-trans linkage content, as well as eight preferential examples according to the invention for the preparation of tertiary amino functionalized polymers having a 1,4-trans linkage content greater than 60% (Examples 3 to 8).

The inherent viscosities mentioned below were established at 25° C. in 0.1 g/dl toluene solution.

EXAMPLE 1

Control Polybutadiene Prepared by Using an Initiator Consisting of Butyl Lithium In 100 ml of cyclohexane, one introduces 150 ml of a 0.87 M solution of trioctylaluminum in toluene and 24 ml of a 1.56 M solution of barium ethyl diglycolate, that is, with an A/B molar ratio of approximately 3.49. The mixture is heated at 40° C. for 30 minutes.

A quantity of that mixture corresponding to 1,790 micromoles of barium is introduced in a medium containing 227.5 g of butadiene and 1.45 of cyclohexane. A quantity of butyl lithium corresponding to a ratio of 2.12 to barium ethyl diglycolate is then introduced. The medium is stirred for 45 minutes at 70° C. One then adds 10 ml of methanol and a volume of a toluene solution of 4,4'-methylene-bis-2,6-ditertiobutylphenol, which volume corresponds to 1.1 g of said compound. The solvent is evaporated under vacuum and a quantity of 182 g of polymer is obtained, which corresponds to a butadiene conversion of 80%.

The inherent viscosity of the polymer is 2.05 dl/g, and its Mooney ML (1+4) viscosity is 24. Its microstructure is:

| % 1,2 linkages | 2 |
| % 1,4-trans linkages | 83 |
| % 1,4-cis linkages | 15 |

The polymolecularity index of the polymer, determined by size exclusion chromatography, is 1.21. Its average molecular weight, determined by osmometry, is 96,000 g/mol.

EXAMPLE 2

Control Polybutadiene Prepared by Using an Initiator Consisting of Butyl Lithium The operating method of Example 1 is reproduced, except that a quantity of trioctylaluminum and barium ethyl diglycolate mixture corresponding to 1020 micromoles of barium ethyl diglycolate is added to the butadiene, and a quantity of butyl lithium is then added, so that the butyl lithium/barium ethyl diglycolate (C/B) molar ratio is 2.62.

After 45 minutes of stirring the polymerization medium at 70° C., a butadiene conversion rate of 83% is measured.

The inherent viscosity of the polymer is 2.26 dl/g, and its Mooney ML (1+4) viscosity is 46.

Its microstructure is:

| % 1,2 linkages | 3 |
| % 1,4-trans linkages | 82 |
| % 1,4-cis linkages | 15 |

The polymolecularity index of the polymer, determined by size exclusion chromatography, is 1.29. Its average molecular weight, determined by osmometry, is 136,000 g/mol.

EXAMPLE 3

Polybutadiene Prepared According to Said First Method (First Working Example), Using an Initiator Consisting of Lithium Hexamethylene Imide The operating method of Example 1 is reproduced, except that, instead of butyl lithium, a quantity of lithium hexamethylene imide is used, so that the lithium hexamethylene imide/barium ethyl diglycolate molar ratio (C/B ratio) is 2.37.

After 65 minutes of stirring the polymerization medium at 70° C., a butadiene conversion rate of 80% is measured.

The inherent viscosity of the polymer is 2.18 dl/g, and its Mooney ML (1+4) viscosity is 38.

Its microstructure is:

| % 1,2 linkages | 4 |
| --- | --- |
| % 1,4-trans linkages | 82 |
| % 1,4-cis linkages | 14 |

The polymolecularity index of the polymer, determined by size exclusion chromatography, is 1.27. Its average molecular weight, determined by osmometry, is 122,000 g/mol.

Analysis of the NMR$^1$H spectrum, which is carried out on a "Bruker AC 200" spectrometer, shows at 2.95 ppm a mass spectrum attributed to the $C_6H_{12}N-CH_2-CH=CH$-polymer methylene group. Quantitative analysis of that spectrum gives a function rate of 4.63 milliequivalents per kg of elastomer which, considering the molecular weight of the polymer, corresponds to an amino function rate of 56%.

EXAMPLE 4

Polybutadiene Prepared According to Said First Method (First Working Example), Using an Initiator Consisting of Lithium Hexamethylene Imide The operating method of Example 2 is reproduced, except that, instead of butyl lithium, a quantity of lithium hexamethylene imide corresponding to a C/B molar ratio of 2.87 is injected into the polymerization medium.

After 60 minutes of stirring the polymerization medium at 70° C., a butadiene conversion rate of 83% is measured.

The inherent viscosity of the polymer is 2.26 dl/g, and its Mooney ML (1+4) viscosity is 51.

Its microstructure is:

| % 1,2 linkages | 4 |
| --- | --- |
| % 1,4-trans linkages | 81 |
| % 1,4-cis linkages | 15 |

The polymolecularity index of the polymer, determined by size exclusion chromatography, is 1.38. Its average molecular weight, determined by osmometry, is 146,000 g/mol.

Quantitative analysis of the NMR$^1$H spectrum, as in Example 3, gives a function rate of 5.19 milliequivalents per kg of elastomer which, considering the molecular weight of said polymer, corresponds to an amino function rate of 76%.

EXAMPLE 5

Polybutadiene Prepared According to Said First Method (First Working Example), Using an Initiator Consisting of Lithium Dibutylamide The operating method of Example 1 is reproduced, except that, instead of butyl lithium, a quantity of lithium dibutylamide is used with a C/B molar ratio of 2.37.

After 65 minutes of stirring the polymerization medium at 70° C., a butadiene conversion rate of 84% is measured.

The inherent viscosity of the polymer is 1.97 dl/g, and its Mooney ML (1+4) viscosity is 22.

Its microstructure is:

| % 1,2 linkages | 4 |
| --- | --- |
| % 1,4-trans linkages | 81 |
| % 1,4-cis linkages | 15 |

The polymolecularity index of the polymer, determined by size exclusion chromatography, is 1.26. Its average molecular weight, determined by osmometry, is 92,000 g/mol.

Analysis of the NMR$^1$H spectrum shows at 2.95 ppm a mass spectrum attributed to the $(butyl)_2N-CH_2-CH=CH$-polymer methylene group. Quantitative analysis of said spectrum gives a function rate of 7.59 milliequivalents per kg of elastomer which, considering the molecular weight of the polymer, corresponds to an amino function rate of 70%.

EXAMPLE 6

Styrene-butadiene Copolymer Prepared According to the Said First Method (First Working Example), Using an Initiator Consisting of Lithium Hexamethylene Imide In 100 ml of cyclohexane, one introduces 150 ml of a 0.87 M solution of trioctylaluminum in toluene and 24 ml of a 1.56 M solution of barium ethyl diglycolate, that is, according to the A/B molar ratio of Example 1. The mixture is heated at 40° C. for 30 minutes.

1. A quantity of that mixture corresponding to 1,100 micromoles of barium is introduced in a medium containing 110 g of butadiene, 90 g of styrene and 1.3 of cyclohexane. A quantity of lithium hexamethylene imide with a C/B molar ratio of 2.74 is then added. The medium is stirred for 60 minutes at 70° C. One then adds 10 ml of methanol and a volume of a toluene solution of 4,4'-methylene-bis-2,6-ditertiobutylphenol, which volume corresponds to 0.72 g of said compound. The solvent is evaporated under vacuum and a monomer conversion rate of 58% is obtained.

The inherent viscosity of the polymer is 1.5 dl/g and the average molecular weight is 110,000 g/mol.

| Its microstructure is: | |
| --- | --- |
| % styrene | 30 |
| Microstructure of the butadiene part: | |
| % 1,2 linkages | 3 |
| % 1,4-trans linkages | 83 |
| % 1,4-cis linkages | 14 |

The polymolecularity index of the polymer, determined by size exclusion chromatography, is 1.42.

Quantitative analysis of the NMR$^1$H spectrum, as in Example 3, gives a function rate of 5.4 milliequivalents per kg of elastomer which, considering the molecular weight of the polymer, corresponds to an amino function rate of 60%.

EXAMPLE 7

Styrene-butadiene Copolymer Prepared According to the Said First Method (First Working Example), Using an Initiator Consisting of Lithium Dibutylanide In 100 ml of cyclohexane, one introduces, as in the previous example, 150 ml of a 0.87 M solution of trioctylaluminum in toluene and 24 ml of a 1.56 M solution of barium ethyl diglycolate. The mixture is heated at 40° C. for 30 minutes.

A quantity of said mixture corresponding to 840 micromoles of barium is introduced in a medium containing 104 g of butadiene, 96 g of styrene and 1.3 of cyclohexane. A quantity of lithium dibutylanide with a C/B molar ratio of 2.74 is then added. The medium is stirred for 60 minutes at 70° C. One then adds 10 ml of methanol and a volume of a toluene solution of 4,4'-methylene-bis-2,6-ditertiobutylphenol corresponding to 0.72 g of that compound.

The duration of polymerization is 23 minutes and the conversion rate is 63%.

The inherent viscosity of the polymer is 1.38 dl/g and its Mooney ML (1+4) viscosity is 41. Its average molecular weight, determined by osmometry, is 140,000 g/mol.

| Its microstructure is: | |
|---|---|
| % styrene | 29 |
| Microstructure of the butadiene part: | |
| % 1,2 linkages | 4 |
| % 1,4-trans linkages | 80 |
| % 1,4-cis linkages | 16 |

The polymolecularity index of the polymer, determined by size exclusion chromatography, is 1.41.

Quantitative analysis of the NMR$^1$H spectrum, as in Example 5, gives a function rate of 5.7 milliequivalents per kg of elastomer which, considering the molecular weight of the polymer, corresponds to an amino function rate of 80%.

EXAMPLE 8

Styrene-butadiene Copolymer Prepared According to the Said First Method (First Working Example), Using an Initiator Made up of High-viscosity Lithium Dibutylanide The operating method of Example 7 is reproduced, except that one uses a quantity of trioctyl aluminum and barium ethyl diglycolate premix corresponding to 470 micromoles of barium ethyl diglycolate. After 33 minutes of polymerization at 70° C., a conversion rate of 62.5% is measured.

The Mooney viscosity of the polymer is 111 and the average molecular weight, determined by osmometry, is 195,000 g/mol. A portion of the polymeric solution is diluted with 35.5 parts of aromatic oil in relation to the elastomer and a Mooney ML (1+4) viscosity of 51 is obtained after drying.

| Its microstructure is: | |
|---|---|
| % styrene | 29 |
| Microstructure of the butadiene part: | |
| % 1,2 linkages | 3 |
| % 1,4-trans linkages | 80 |
| % 1,4-cis linkages | 17 |

The polymolecularity index of the polymer, determined by size exclusion chromatography, is 1.43.

Quantitative analysis of the NMR$^1$H spectrum, as in Example 5, gives a function rate of 3.7 milliequivalents per kg of elastomer which, considering the molecular weight of the polymer, corresponds to an amino function rate of 70%.

EXAMPLE 9

Polybutadiene Prepared According to Said First Method (First Working Example), Using an Initiator Consisting of an Aminolithium Polymer Obtained by Anionic Means In 100 ml of cyclohexane, one introduces 26 g of butadiene and 4,815 micromoles of lithium hexamethylene imide. After 7 hours of polymerization at 25° C., an aminolithium polybutadiene polymer C is obtained and 100% butadiene conversion is obtained.

Then, in 10 ml of cyclohexane, one introduces 20 ml of a 1.075 M solution of trioctylaluminum (A) in cyclohexane and 4 ml of a 1.54 M solution of barium ethyl diglycolate (B) in cyclohexane. Said mixture is heated for 30 minutes at 40° C.

A quantity of said mixture corresponding to 91 micromoles of barium is introduced in a medium containing 22.75 g of butadiene and 145 ml of cyclohexane. One then adds a quantity of the polymer C previously obtained corresponding to a C/B molar ratio of 2.12.

After 40 minutes of polymerization at 70° C., a conversion rate of 84% is measured. The inherent viscosity of the polymer is 1.66 dl/g, its Mooney ML (1+4) viscosity is 30, the molecular weight determined by osmometry is 104,000 g/mol, and the polymolecularity index, determined by the SEC technique, is 1.2.

The microstructure of the polymer finally obtained is:

| % 1,4-trans linkages | 76 |
|---|---|
| % 1,4-cis linkages | 17 |
| % 1,2 linkages | 7 |

The function rate, determined as in Example 3 by NMR, is 8 meq/kg, which, taking into account the molecular weight of the polymer, corresponds to a function rate of 80%.

EXAMPLE 10

Polybutadiene Prepared According to Said First Method (First Working Example), Using an Aminolithium Polymeric Initiator Obtained by Anionic Means In 25 ml of cyclohexane, a premix of 21.7 millimoles of trioctylaluminum and 6.16 millimoles of barium ethyl diglycolate is prepared. After 20 minutes of stirring said medium at 40° C., a quantity of said premix corresponding to 893 micromoles of barium and 446 micromoles of butyl lithium is added in 25 ml of cyclohexane. After 10 minutes of stirring at 40° C., 1,660 micromoles of an aminolithium polymer C is added, which is synthesized as in Example 9. A quantity of cyclohexane is injected, which is adjusted so that the total volume of catalytic solution is 60 ml.

After 10 minutes of stirring at 40° C., a quantity of that solution corresponding to 179 micromoles of barium is injected into a medium containing 145 mg of cyclohexane and 22.75 g of butadiene.

After 50 minutes of polymerization at 70° C., a conversion rate of 100% is measured. The inherent viscosity of the polymer is 1.17 dl/g, the molecular weight determined by osmometry is 70,000 g/mol and the polymolecularity index, determined by the SEC technique, is 1.36.

The microstructure of the polymer obtained is:

| % 1,4-trans linkages | 74 |
|---|---|
| % 1,4-cis linkages | 18 |
| % 1,2 linkages | 8 |

The function rate determined by NMR, as in Example 3, is 8.9 meq/kg, which, taking into account the molecular weight of the polymer, corresponds to a function rate of 60%.

EXAMPLE 11

Polybutadiene Prepared According to Said Second Method, Using an Aminolithium Polymeric Initiator Obtained by Anionic Means A premix of 2 millimoles of trioctylaluminum and of the aminolithium polymer C synthesized in Example 9 is prepared in 65 ml of cyclohexane. After 20 minutes of stirring at 25° C., a quantity of that mixture corresponding to 182 micromoles of aluminum is added to a medium containing 145 ml of cyclohexane and 22.75 g of butadiene, and then a quantity of barium ethyl diglycolate corresponding to 91 micromoles of barium is introduced. After 40 minutes of polymerization at 70° C., a conversion rate of 84% is measured. The inherent viscosity of the polymer is 1.86 dl/g, and its Mooney ML (1+4) viscosity is 30; the molecular weight determined by osmometry is 105,000 g/mol and the polymolecularity index, determined by SEC, is 1.6.

The microstructure of the polymer is:

| % 1,4-trans linkages: | 77 |
|---|---|
| % 1,4-cis linkages: | 17 |
| % 1, 2 linkages: | 6 |

The function rate determined by NMR (as in Example 3), is 6.85 meq/kg, which, taking into account the molecular weight of the polymer, corresponds to a function rate of 70%.

EXAMPLE 12

Polybutadiene Prepared According to Said Second Method, Using an Aminolithium Polymeric Initiator Obtained by Anionic Means and with Another Solvent An aminolithium polymer C is synthesized according to the method described in Example 9, except that toluene is used as solvent and the duration of polymerization is 5 hours and 30 minutes.

A premix of 2 millimoles of trioctylaluminum and of said polymer C just synthesized is prepared in 65 ml of toluene. After 20 minutes of stirring at 25° C., a quantity of said mixture corresponding to 182 micromoles of aluminum is added to a medium containing 145 ml of cyclohexane and 22.75 g of butadiene, and then a quantity of barium ethyl diglycolate corresponding to 91 micromoles of barium is introduced.

After 40 minutes of polymerization at 70° C., a conversion rate of 76% is measured. The inherent viscosity of the polymer is 1.65 dl/g; the molecular weight determined by osmometry is 94,000 g/mol and the polymolecularity index, determined by SEC, is 1.81.

The microstructure of the polymer is:

| % 1,4-trans linkages: | 76 |
|---|---|
| % 1,4-cis linkages: | 18 |
| % 1, 2 linkages: | 6 |

The function rate determined by NMR (as in Example 3), is 6.85 meq/kg, which, taking into account the molecular weight of the polymer, corresponds to a function rate of 65%.

The results obtained in Examples 3 to 12 according to the invention reveal, on the one hand, a 1,4-trans linkage content greater than 70% and, on the other, an amino functionalization rate of at least 56%.

It will be observed that the anionic polymerization process, according to the invention, for the preparation of polymers presenting the aforesaid characteristics is employed without addition of a polar agent, which is usually intended to solubilize a lithium amide base initiator.

It will also be observed that the polymers obtained according to the process of the invention present a reduced viscosity, which is comparable to the viscosities obtained with an initiator consisting of butyl lithium (Examples 1 and 2).

It will further be observed that the impurities in the polymerization medium can be neutralized by the addition of butyl lithium.

Two series of experiments are presented below, which demonstrate this improvement of hysteretic properties for compositions filled with silica and with carbon black respectively.

In these experiments, the properties of the compositions are evaluated as follows:

moduli of elongation at 10% (MA10), at 100% (MA100) and at 300% (MA300) measured according to the ISO37 standard;

Scott's fracture index measured at 20° C. and at 100° C. (breaking load in Mpa/elongation at rupture in %);

hysteretic losses measured at 60° C. in %;

dynamic shear properties: measurement made as a function of deformation at 23° C. and at 10 Hz. Nonlinearity, expressed in Mpa, is the difference in modulus between 0.15 and 50% peak-to-peak deformation.

Hysteresis is expressed by the measurement of tgδ at 7% deformation according to the ASTM D-2231-71 standard.

First Series of Experiments: Silica Mixture

It was sought to demonstrate in this series of experiments the contribution, within a composition C1 (close to that of a tire tread), of a natural rubber (NR)/"BR3" polybutadiene mixture prepared according to the invention.

This "BR3" polybutadiene is prepared as described in the above Example 3, except that one injects, on the one hand, a quantity of co-catalytic solution corresponding to a barium quantity of 1,250 micromoles and, on the other, a quantity of lithium hexamethylene imide corresponding to a C/B molar ratio of 2.75. After 50 minutes of polymerization at 70° C., a butadiene conversion rate of 85% is measured.

The average molecular weight of that "BR3" polymer, determined by osmometry, is 105,000 g/mol.

The inherent viscosity of that polymer is 1.67 dl/g, its Mooney ML (1+4) viscosity being 28.

Its microstructure is:

| % 1, 2 linkages: | 3 |
| % 1,4-trans linkages: | 79 |
| % 1,4-cis linkages: | 18 |

Analysis of the NMR$^1$H spectrum gives, as in Example 3, an amino function rate of 6.7 meq/kg, which, considering the molecular weight of the polymer, corresponds to a function rate of 70%.

A mixture of "BR1" polybutadiene prepared according to the invention and natural rubber (NR) was used as control mixture.

This control polybutadiene is prepared as described in the above Example 1, except that one injects, on the one hand, a quantity of the co-catalytic solution corresponding to a barium quantity of 1,820 micromoles and, on the other, a quantity of butyl lithium corresponding to a C/B ratio of 2.2. After 45 minutes of polymerization at 70° C., a butadiene conversion rate of 79% is measured.

The inherent viscosity of the polymer is 1.88 dl/g, its Mooney ML (1+4) viscosity being 30. Its microstructure is:

| % 1, 2 linkages: | 3 |
| % 1,4-trans linkages: | 82 |
| % 1,4-cis linkages: | 15 |

The polymolecularity index of the polymer, determined by size exclusion chromatography, is 1.3. Its average molecular weight, determined by osmometry, is 105,000 g/mol.

The formulation of rubbers of composition C1 is as follows (parts by weight):

| | |
|---|---|
| NR/"BR1" or NR/"BR3" | 80/20 |
| ZEOSIL 1165 MP silica | 50 |
| ZnO | 3.0 |
| stearic acid | 2.5 |
| N-1,3-dimethylbutyl-N'-phenyl-p-phenylenediamine | 2.5 |
| paraffin | 1.0 |
| sulfur | 1.5 |
| N-cyclohexyl-benzothiazyl-sulfenamide (CBS) | 1.8 |

The rubbers according to composition C1 are subjected to thermomechanical work in two stages lasting 5 minutes and 4 minutes, respectively, at an average pallet speed of 45 revolutions per minute and until reaching a maximum drop temperature of 160° C., while the stage of incorporation of sulfur and accelerators is carried out at 30° on a cylinder tool.

These rubbers are then vulcanized at 150° C. for 50 minutes.

The table below reports properties of composition C1 in an unvulcanized and vulcanized state, depending on whether it contains the NR/"BR1" control polymer mixture or the polymer mixture according to the NR/"BR3" invention:

| | C1 with NR/"BR3" | C1 with NR/"BR1" |
|---|---|---|
| Unvulcanized state | | |
| ML (1 + 4) at 100EC | 65 | 61 |
| Vulcanized state | | |
| Shore | 63.4 | 63.5 |
| MA10 | 4.79 | 4.87 |
| MA100 | 1.92 | 1.94 |
| MA300 | 2.32 | 2.25 |
| MA300/MA100 | 1.21 | 1.16 |
| Scott at 20° C.: Breaking load | 23.0 | 23.0 |
| Elongation at rupture (%) | 500 | 500 |
| Losses 60° C. (deformation = 40%) | 17.3 | 18.6 |
| Dynamic properties (between 0.15% and 50% deformation/10 Hz) | | |
| Delta G* at 23° C. | 1.87 | 2.25 |
| tgδ$_{max}$ at 23° C. | 0.140 | 0.150 |

In conclusion, it appears that the composition C1 containing a "BR3" polymer according to the invention presents a reduced hysteresis with low and high deformation (losses at 60° C. and tgδ at 23° C. respectively), compared to the composition C1 containing the "BR1" control polymer.

This results in a reduced heating for composition according to the invention and, consequently, reduced rolling resistance for a tire casing containing said composition according to the invention.

Second Series of Experiments: Carbon Black Mixture

It was sought to demonstrate here the contribution, within a composition C2 (also close to that of a tire tread), of the aforesaid natural rubber (NR)/"BR3" polybutadiene mixture.

The said "BR1" polybutadiene/NR mixture was used as control mixture.

The formulation of rubbers of composition C2 is as follows (parts by weight):

| | |
|---|---|
| NR/"BR1" or NR/"BR3" | 60/40 |
| N234 carbon black | 54 |
| ZnO | 3.0 |
| stearic acid | 1.5 |
| N-1,3-dimethylbutyl-N'-phenyl-p-phenylenediamine (antioxidant) | 2.0 |
| paraffin | 1.0 |
| sulfur | 1.1 |
| N-cyclohexyl-benzothiazyl-sulfenamide (CBS) | 1.1 |

The rubbers of composition C2 are introduced at 90° C., thermomechanical work is carried out up to 100° C., and then carbon black, ZnO, stearic acid, paraffin and antioxidant are added. The drop is made at 165° C. after a piston stroke at 150° C. and one proceeds to incorporate the sulfur and the accelerators.

Composition C2 is then vulcanized at 150° C. for 50 minutes.

The table below reports properties of composition C2 in unvulcanized and vulcanized state, depending on whether it contains the NR/"BR1" control polymer mixture or the polymer mixture according to the NR/"BR3" invention:

|  | C2 with NR/"BR3" | C2 with NR/"BR1" |
|---|---|---|
| Unvulcanized state | | |
| ML (1 + 4) at 100° C. | 113 | 107 |
| Vulcanized state | | |
| Shore | 65.5 | 68.6 |
| MA10 | 5.58 | 6.52 |
| MA100 | 2.00 | 2.25 |
| MA300 | 2.56 | 2.60 |
| MA300/MA100 | 1.28 | 1.16 |
| Scott at 20° C.: Breaking load | 24.0 | 23.0 |
| Elongation at rupture (%) | 500 | 500 |
| Losses 60° C. (deformation = 40%) | 28 | 30.8 |
| Dynamic properties (deformation = 0.15%–50%/10 Hz) | | |
| Delta G* at 23° C. | 1.86 | 3.00 |
| tgδ$_{max}$ at 23° C. | 0.165 | 0.185 |

In conclusion, it appears that the composition C2 containing a "BR3" polymer according to the invention also presents a reduced hysteresis with low and high deformation (losses at 60° C. and tgδ at 23° C.), compared to the composition C1 containing the "BR1" control polymer.

This results in a reduced heating for composition according to the invention and, consequently, reduced rolling resistance for a tire casing containing said composition according to the invention.

We claim:

1. A catalytic system for obtaining amino-functionalized diene polymers with high 1,4-trans linkage content, consisting essentially of at least one hydrocarbon solvent, one compound A of a IIIA group metal, one compound B of an alkaline earth metal and one aminolithium initiator C, wherein said initiator C is selected from the group consisting of a lithium amide and a polymer obtained by anionic means presenting a C—Li bond and an amino function.

2. The catalytic system of claim 1, wherein said aminolithium initiator C is a lithium amide.

3. The catalytic system of claim 1, wherein said aminolithium initiator C is a polymer obtained by anionic means, presenting a C—Li bond and an amino function.

4. The catalytic system of claim 1, wherein initiator C is lithium dibutyl amide or lithium hexamethylene imide.

5. The catalytic system of claim 1, wherein compound A is a trialkylaluminum, wherein the trialkylaluminum has an alkyl group having carbon atoms in a range from 1 to 12.

6. The catalytic system of claim 5, wherein compound A is trioctylaluminum.

7. The catalytic system of claim 1, wherein compound B is selected from the group consisting of a barium alcoholate, a strontium alcoholate and a calcium alcoholate.

8. The catalytic system of claim 7, wherein compound B is barium ethyl diglycolate or barium nonylphenoxide.

9. The catalytic system of claim 1, wherein said hydrocarbon solvent is selected from the group consisting of toluene, cyclohexane, and mixtures thereof.

10. The catalytic system of claim 1, wherein initiator C is a lithium amide of the formula XLi where X is —NR$_1$R$_2$ or

R$_1$ and R$_2$ each being an alkyl group where the total number of carbon atoms in R$_1$+R$_2$ is 2 to 15 and n being a number from 2 to 15.

11. The catalytic system of claim 1, wherein initiator C and compound B are present in a C/B molar ratio of between 0.2 and 4.

12. The catalytic system of claim 1, wherein said compounds A and B are present in an A/B molar ratio range between 0.5 and 5.

* * * * *